Sept. 28, 1965     C. B. BLAIR     3,208,612
BALE HANDLING HEAD
Filed April 22, 1963     3 Sheets-Sheet 1
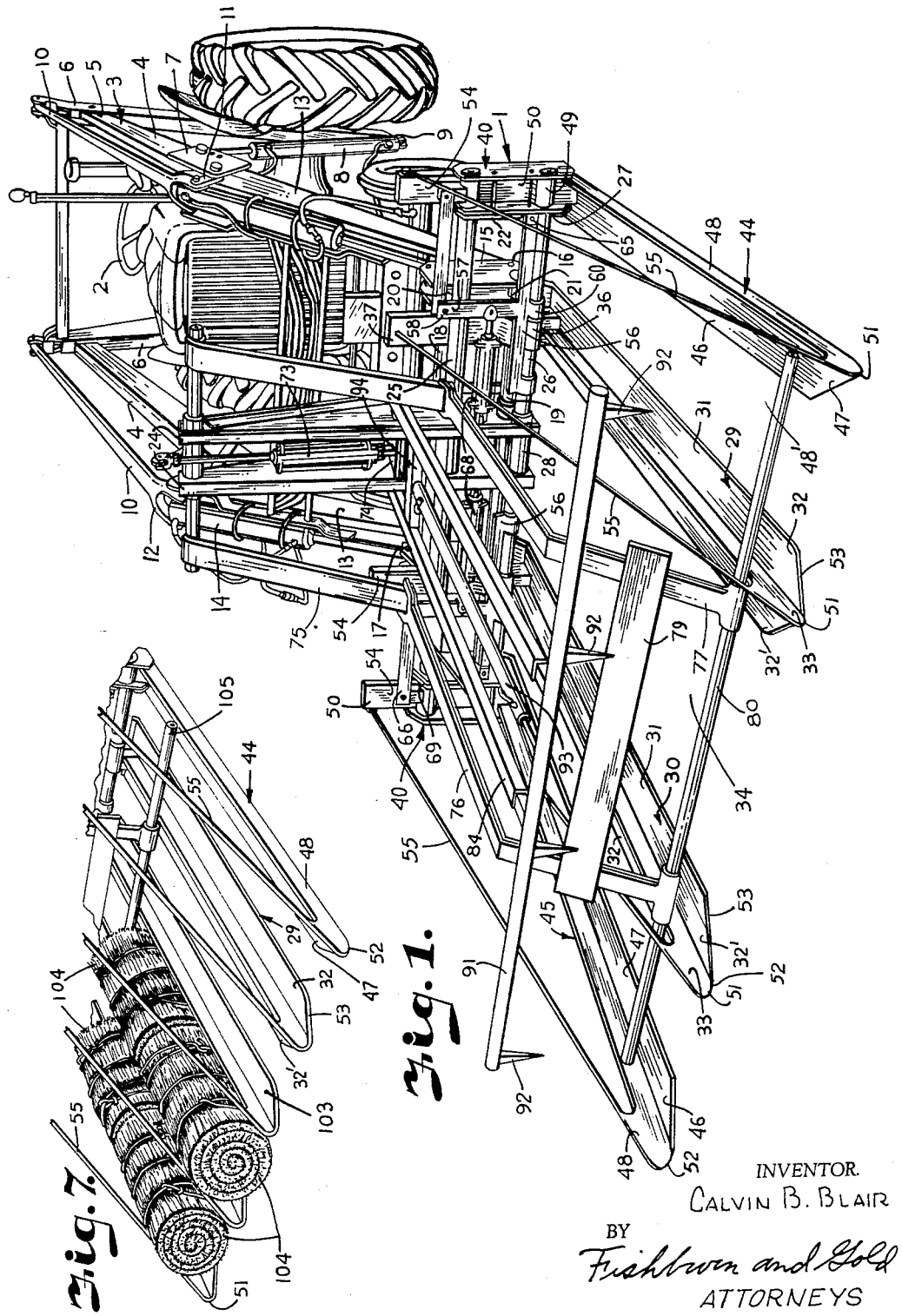
INVENTOR.
CALVIN B. BLAIR
BY Fishburn and Gold
ATTORNEYS Sept. 28, 1965 C. B. BLAIR 3,208,612
BALE HANDLING HEAD
Filed April 22, 1963 3 Sheets-Sheet 2
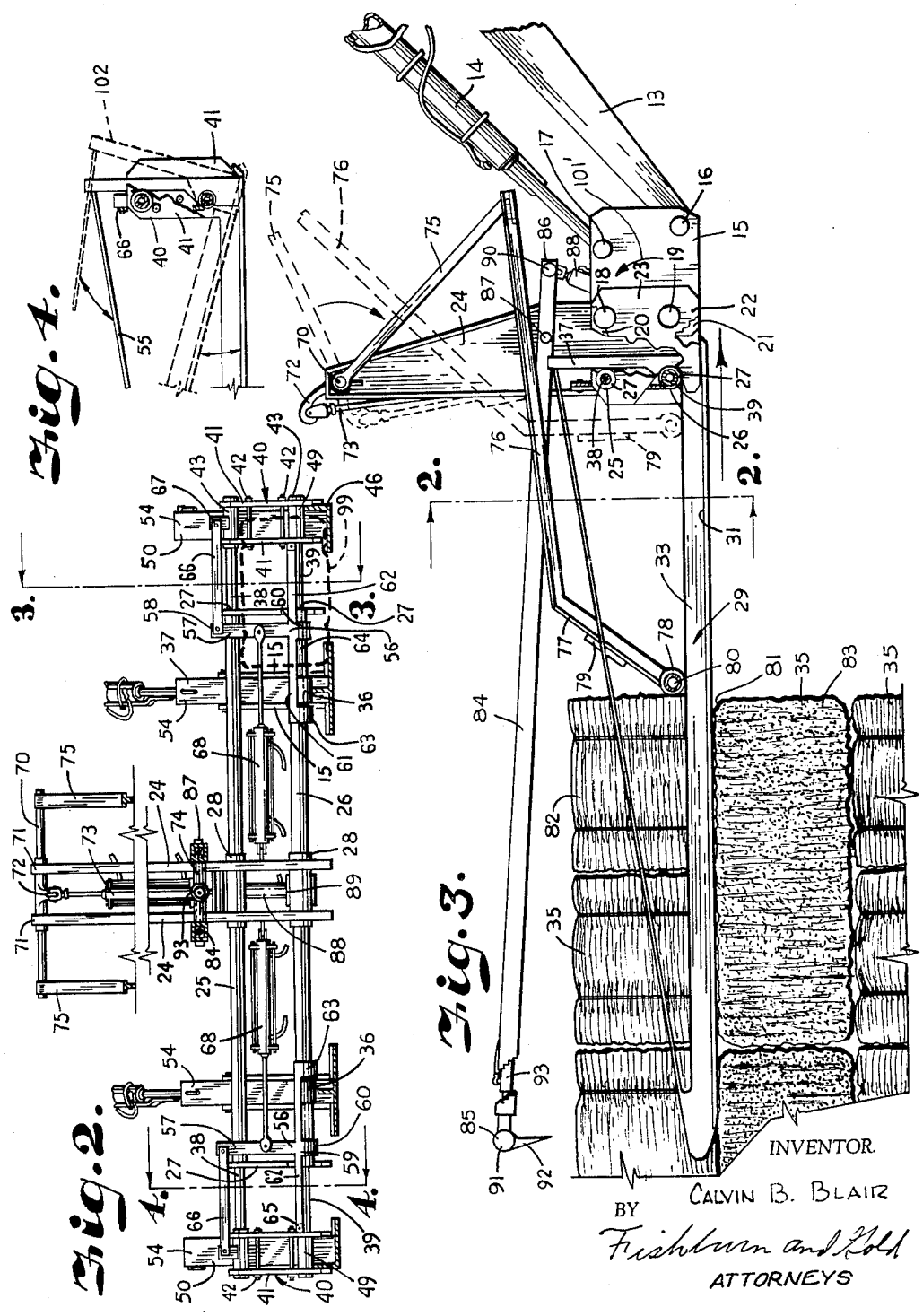
INVENTOR.
CALVIN B. BLAIR
BY Fishburn and Gold
ATTORNEYS Sept. 28, 1965 C. B. BLAIR 3,208,612
BALE HANDLING HEAD
Filed April 22, 1963 3 Sheets-Sheet 3

INVENTOR.
CALVIN B BLAIR
BY
Fishburn and Gold
ATTORNEYS

United States Patent Office 3,208,612
Patented Sept. 28, 1965

3,208,612
BALE HANDLING HEAD
Calvin B. Blair, Box 76, Barnard, Kans.
Filed Apr. 22, 1963, Ser. No. 274,437
16 Claims. (Cl. 214—144)

This invention relates to bale handling apparatus, and more particularly to a mobile head for use with a self-propelled tractor for sweeping, stacking and unloading baled hay and the like.

In common practice, after standing hay has been furrowed and cured, it is baled into generally rectangular bales which are merely dropped to the ground after passing through mobile baling machinery. Subsequently, the bales are swept or picked up and placed in layers so as to produce a self-sustaining stack. Heretofore, a pick-up machine together with hand labor was usually required in conjunction with a wagon to pick up the bales in the field and transport same to a location where the stack was formed. Then, additional machinery and considerable hand labor was required for unloading the wagon and stacking the bales in proper relationship. Even with the multiple machines and considerable hand labor, the stacking job was a relatively slow process and the finished stack often exhibited excessively wide spaces or seams between the respective bales which weakened the stack and permitted the elements to easily enter between the bales.

When it was desired to unload the hay from the bale stack, it was the usual procedure to individually lift or push the bales off the top layer, also a relatively slow and difficult process, and in the event that the bales were frozen together bale removal often became extremely tedious. When using conventional bale loading and unloading equipment the danger existed of displacing remaining bales or actually upsetting the stack which not only rendered the individual bales more difficult to pick up either by hand or with loading apparatus, but also often rendered the hay unusable due to excess exposure to the elements.

The principal objects of the present invention are: to provide a mobile bale handling head adapted for use with a self-propelled truck or tractor of the type having load elevating apparatus, which head permits rapid multiple bale sweeping or pick up in the field without hand labor; to provide such a device adapted to pick up the individual bales in a pattern which forms a layer for a bale stack; to provide such apparatus wherein the bale layer is so arranged that it is easily placed at a relatively rotated position on other layers to cross tie the bale and render same securely self-supporting; to provide such a bale loading head which securely compresses the bales into a tight stack layer pattern in both directions so as to avoid wide spaces or seams between the bales; to provide such apparatus having elongated forwardly extending bale-supporting fingers or teeth from which bales are unloaded onto a bale stack without danger of pushing the stack over due to the reaction of a bale pushoff mechanism or pulling the stack over due to the friction of withdrawing the teeth from between the stacked bales; to provide such apparatus teeth which are hinged in a manner which permits flat engagement with the top layer of a bale stack so as to avoid uneven contact with the top layer of the stack; to provide such a bale handling head wherein the fingers or teeth may be closed toward each other after pick up so as to securely grip the bales for transfer at high speed; to provide such fingers or teeth which are flexible in both lateral and vertical directions so as to easily ride over and deflect around small ground obstructions and permit individual teeth to float over unlevel terrain such as around the slope of terraces and ditches; to provide such apparatus wherein the fingers or teeth are easily remotely adjustably varied in lateral distance from each other for accommodating various size bales and locating seams in stacks for reloading even though the stack may have settled and slipped from the original position; to provide such fingers or teeth which are automatically self-centering due to the reaction of gravity thereon after being deflected from the straight forward position; to provide such apparatus having a retainer mechanism which is adapted to maintain the bales in proper position on the stack during withdrawal or backing of the tractor regardless of the speed of backing and without undue pressure on the bales which would tend to prematurely unload the bales or upset the stack; to provide such apparatus having positive reloading features which permit the tips of the teeth to be driven into the seams of a frozen stack without danger of upsetting the stack; and to provide such a loading head which is easily adapted to handle cylindrical as well as rectangular bales, is simple and rugged in construction, and may be operated with relatively unskilled labor.

Other objects and advantages of this invention will become apparent from the following description taken in connection with the accompanying drawings wherein are set forth by way of illustration and example certain embodiments of this invention.

FIG. 1 is a perspective view showing a mobile bale handling head embodying this invention mounted on a self-propelled tractor of the type having load-elevating apparatus, the head being illustrated in the closed or laterally retracted posiiton.

FIG. 2 is a fragmentary front elevational cross-sectional view through the head taken on the line 2—2, FIG. 3, showing the head in the open or laterally expanded position.

FIG. 3 is a fragmentary side elevational cross-sectional view through the head taken on the line 3—3, FIG. 2, particularly showing bale contacting retaining apparatus for urging the bales from supporting teeth at the same rate that the teeth are withdrawn from a bale stack.

FIG. 4 is a fragmentary side elevational cross-sectional view through the head taken on the line 4—4, FIG. 2, illustrating the vertical pivotal mounting for the bale supporting teeth.

FIG. 7 is a modified embodiment of this invention on a reduced scale having a central tooth equalizing the tooth spacing for handling cylindrical bales.

Figures 5, 6:
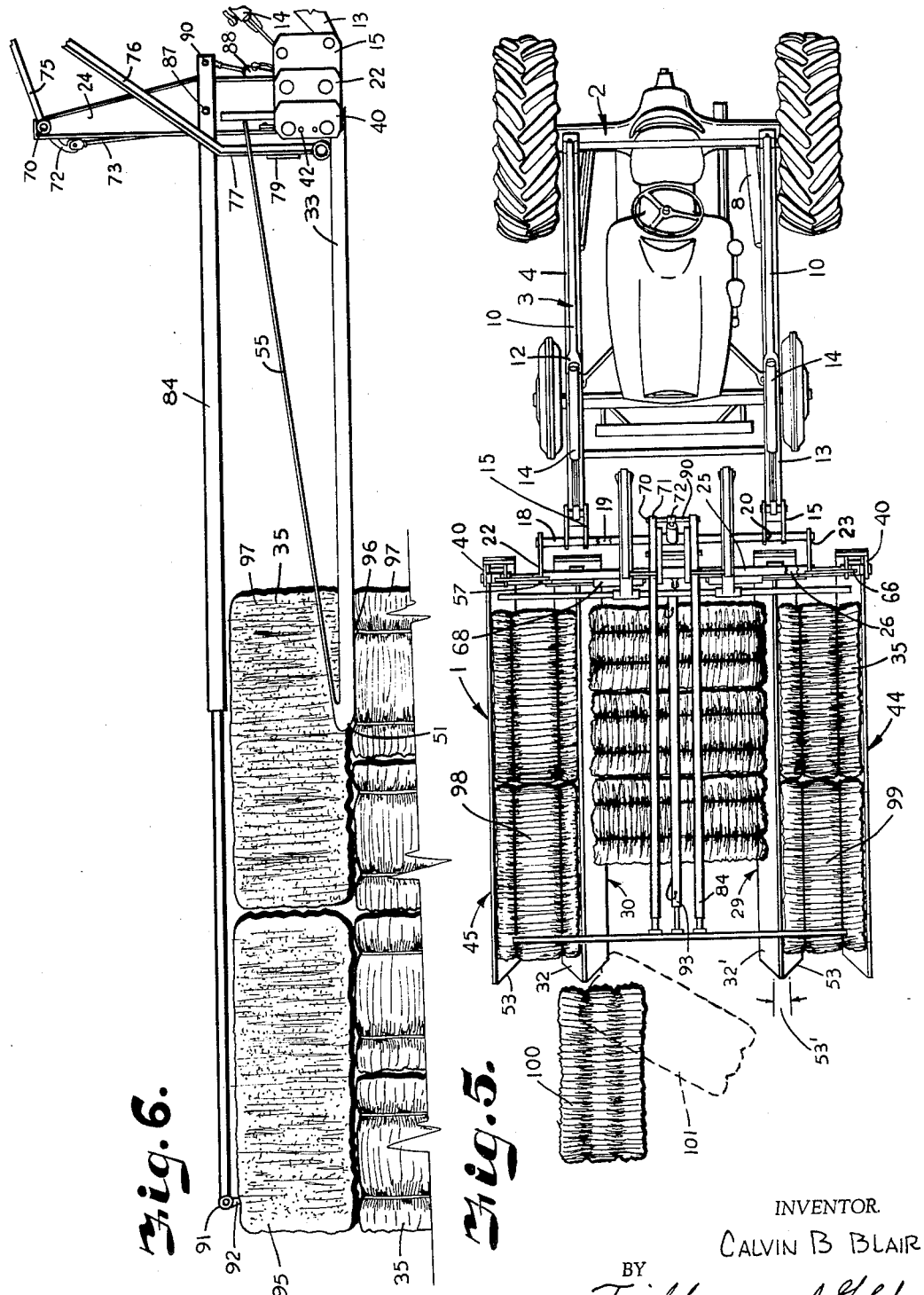
FIG. 5 is a plan view of the head and tractor on a reduced scale showing the apparatus sweeping or picking up a loose bale from the ground.
FIG. 6 is a fragmentary side elevational view on a slightly reduced scale of the baled hay handling head particularly illustrating a reloading member in fully extended position for pulling teeth tips into the seams of a frozen bale stack.

Referring to the drawings in more detail:

The reference numeral 1 generally indicates a mobile baled hay sweeper, stacker and unloader head adapated for use with a self-propelled tractor 2 of the type having load-elevating apparatus generally designated 3. The load-elevating apparatus 3 includes a pair of spaced-apart forwardly extending elongated parallel booms 4 having inner ends 5 pivotally mounted on vertically extending standards 6 rigidly mounted on the frame of the tractor. The booms 4 have outer ends 7 movable from a lowered to a raised position by means of extensible hydraulic lifting cylinders 8 respectively pivoted to the frame of the tractor 2 at 9 and to the booms 4 at the outer ends 7. A pair of elongated link arms 10 are pivotally mounted at the rear thereof to the standards 6 at positions spaced above the boom inner ends 5 and near the front thereof to short downwardly extending links 11. The links 11 are, in turn, pivoted to the boom outer ends 7, forming parallelogram linkages which maintain the link arms 10 and booms 4 respectively spaced apart but substantially parallel to each other regardless of the elevated position of the boom outer ends 7.

The link arms 10 each have outer ends in the form of yokes 12 maintained by the parallelogram linkages in positions substantially equally spaced above the boom outer ends 7 regardless of the elevated position of said boms. A rigid support beam 13 is fixed to each of the booms 4 and extends forwardly from the respective boom outer ends 7. Extensible hydraulic cylinders 14 are pivotally connected at the rear ends thereof to the yokes 12 and extend forwardly generally parallel to the support beams 13 and are spaced thereabove.

Referring more particularly to the novel structure of this invention, a pair of spaced-apart vertical generally rectangular rigid plates 15 extend parallel to and forwardly of each of the support beams 13 and are pivotally connected at the lower rear portions 16 thereof to the respective support beams for pivotal movement in vertical planes extending longitudinally of the booms 4. The pairs of rigid plates 15 are also pivotally connected at the upper rear portions 17 thereof to the forward ends of the extensible cylinders 14 whereby the extension and retraction of the pairs of rigid plates 15 about the support beams.

Upper and lower horizontal parallel transverse rods 18 and 19 respectively are fixed to and extend through the pairs of rigid plates 15 at respective upper and lower forward positions 20 and 21 thereon. A vertical plate member 22 is spaced laterally outwardly of and parallel to each of the pairs of rigid plates 15 and the parallel rods 18 and 19 extend through the rear portion 23 of the plate members 22 and support same in forwardly extending spaced-apart relation.

A pair of laterally spaced-apart rigid mast members 24 are secured to the parallel rods 18 and 19 and extend upwardly therefrom near the longitudinal center of the tractor 2 and between the plate members 22. Upper and lower vertically spaced-apart transverse tubes 25 and 26 respectively have open opposite ends 27 and are secured at said opposite ends to the respective vertical plate members 22 without obstructing the open ends 27. The transverse tubes extend through and are secured to the mast members 24 by means of rigid interconnecting sleeves 28.

A pair of elongated normally parallel spaced-apart bale edge supporting inner fingers or teeth 29 and 30 each include a normally horizontal forwardly extending beam portion 31 having a cross-section in the shape of an inverted T formed of an oppositely extending lower outside horizontal leg 32, inside horizontal legs 32' and a central upwardly extending leg 33. The upwardly extending legs 33 of the respective inner teeth 29 and 30 are spaced apart approximately the length of a hay bale; however, as will appear hereinafter, this distance is variable. The distance between the inside horizontal legs 32' is substantially less than the length of a bale but great enough to define a substantial opening 34 therebetween for exposing the bottom surface of bales 35 carried on the inside legs 32' between the beam portions 31. The inner teeth beam portions 31 extend forwardly of the tubes 25 and 26 a distance somewhat greater than the total width of four bales 35 and each of the beam portions 31 has a transverse supporting sleeve 36 fixed at the rear thereof and slidably and pivotally mounted on the lower tube 26 for transverse and respectively independent vertical motion of the inner teeth with respect to the plate members 22. The beam portions 31 each include an integral upwardly extending post portion 37 at the rear thereof adjacent the sleeve 36 and normally slidably resting against the rear of the upper tube 25 for supporting the inner teeth beam portions against downward pivoting about the lower tube 26 but permitting transverse sliding and upward pivoting thereabout.

Oppositely extending pairs of upper and lower transverse shafts 38 and 39 are telescopically slidably received and supported in the respective upper and lower tube opposite ends 27 and the respective pairs of shafts 38 and 39 each have a cage member 40 secured thereto adjacent the outer ends thereof and slidable therewith toward and away from the tube opposite ends 27. The cage members 40 each include a pair of laterally spaced-apart vertically extending parallel support webs 41 maintained in fixed relation on the respective pairs of tubes 38 and 39 by means of suitable retaining bolts 42. Sleeves 43 rigidly interconnect the cage members 40 with the respective shafts 38 and 39.

A pair of elongated normally parallel outer fingers or teeth 44 and 45 are respectively spaced outwardly of the inner teeth 29 and 30 and normally extend parallel thereto. The outer teeth 44 and 45 each include a bale edge supporting normally horizontal angle beam portion 46 having an inwardly extending lower horizontal leg 47 joined to an upwardly extending leg 48. The upwardly extending legs 48 are spaced from the nearest inner tooth upwardly extending leg 33 approximately the width of a bale 35, however, this distance is adjustable as noted hereinafter. The closest distance between the horizontal legs 47 and the respective nearest outside horizontal legs 32 is substantially less than the width of a bale but great enough to define a substantial opening 48' for exposing the bottom of a bale carried therebetween. The outer teeth beam portions 46 each extend forwardly of the shafts 38 and 39 and have a transverse supporting sleeve 49 fixed at the rear thereof and pivotally mounted on the respective lower shafts 39 between the respective web pairs 41 for independent vertical pivotal motion with respect to the plate members 22. The outer teeth beam portions 46 each include an upwardly extending post portion 50 at the rear thereof adjacent the supporting sleeve 49 and normally resting against the rear of the respective upper shafts 38 for supporting the latter beam portions against downward pivoting about the lower shafts 39.

The outer teeth sleeves and posts are caged between the support webs 41 to substantially prevent transverse sliding of the outer teeth along the shafts 38 and 39 but permit upward pivoting of the outer teeth beam portions 46. The inner and outer teeth horizontal legs 32, 32' and 47 are normally in a common horizontal plane and the respective beam portions terminate at the front thereof in tips 51. The tips 51 each have a downwardly and rearwardly sloping underside 52 for urging the respective tooth pivotally upwardly to ride over small obstructions at ground level and seek bale stack seams as noted below. The horizontal legs 32, 32' and 47 each exhibit laterally rewardly tapered front edges 53 to induce a lateral motion of the tips 51 as illustrated at 53' in case of an obstruction striking thereagainst, the lateral motion being permitted by a small amount of play between the respective supporting sleeves 36 and 49 and the mounting tube or shaft extending therethrough. A front or aligning surface 54 on the respective post portions 37 and 50 cooperates with the respective tube 25 and shaft 38 for redirecting the tips 51 to their proper forwardly extending positions. This occurs due to the force of gravity acting on the forwardly extending portions of the teeth to urge the surface 54 against the tube 25. Suitable tensile struts 55 are connected between the respective teeth tips 51 and post portions 37 and 50 to add rigidity to the tooth structure.

A pair of frame members broadly designated 56 are respectively mirror images of each other and are spaced laterally and outwardly on opposite sides of the mast members 24. The frame members 56 each include a vertical bar 57 having an upper end 58 adjacent the upper tube 25 and a lower end 59 terminating in a sleeve 60 surrounding and slidable along the lower tube 26 and respectively selectively engageable with the inner teeth sleeves 36. Inwardly and outwardly extending transverse struts 61 and 62 respectively are fixed to the respective bar sleeves 60 and struts 61 extend inwardly past the inner teeth sleeves 60 and terminate in inner end sleeves 63 surrounding and slidable along the lower tube 26. The inner end sleeves 63 are respectively selectively engageable with the inner teeth sleeves 36 and are spaced from the respective bar sleeves 60 a distance greater than the transverse length of the inner teeth sleeves 36 forming free stroke space 64 therebetween. The outwardly extending transverse struts 62 are joined at the respective outer ends 65 thereof to the respective cage members 40. Elongated transverse brace members 66 extend parallel to the tubes 25 and 26 and are secured at opposite ends thereof respectively to the vertical bar upper ends 58 and to the cage members 40 at 67 to prevent cocking or jamming of the respective frame members 56 when sliding transversely on the lower tube 26.

Transverse oppositely extending extensible hydraulic cylinders 68 are pivotally conected at the outer ends thereof respectively to the vertical bars 57 intermediate the ends thereof. The inner ends of the cylinders 68 are connected to the respective mast members 24 for selectively urging the cage members 40 in opposite directions transversely of the head 1. It is to be understood that the stroke of the transverse cylinders 68 is greater than the free stroke space 64 whereby upon retraction of the last named cylinders from an extended position the outer teeth 44 and 45 first move inwardly a distance equal to the free stroke space without disturbing the position of the inner teeth 29 and 30 and then upon further retraction of the cylinders the outer and inner teeth move inwardly simultaneously to the limit position determined, in the illustrated example, by engagement between the respective vertical plate members 22 and the cage members 40, illustrated at 69, FIG. 1.

A transverse retainer shaft 70 is rotatably mounted at the upper ends 71 of the respective mast members 24 and extends laterally outwardly therefrom. A crank arm 72 is fixed to the retainer shaft 70 between the mast members 24 and an upwardly extending hydraulic extensible cylinder 73 is pivotally mounted at the lower end thereof to an anchor bar 74 fixed between the mast members 24. The upper end of the cylinder 73 is pivotally mounted on the crank arm 72 for selectively rotating the retainer shaft 70 through an arc of somewhat less than 180°. A pair of parallel rigid arms 75 are respectively secured at one end thereof to the outer ends of the retainer shaft 70 and extend generally downwardly therefrom. A pair of forwardly extending strut members 76 are respectively pivotally mounted at the rear ends thereof to the lower ends of the rigid arms 75 and have respective forward spaced apart end portions 77 sloping downwardly and terminating in aligned sleeves 78 located adjacent the top of the upwardly extending legs 33 and 48. An initial contact transverse bumper plate 79 is secured to and extends laterally beyond the respective forward end portions 77 and is located between the inner teeth 29 and 30. A transverse bumper rod or bar 80 is anchored in the sleeves 78. The bar 80 slidably rests on the upwardly extending legs 33 and extends substantially the entire distance between the outer teeth upwardly extending legs 48.

The cylinder 73 is limited in maximum extensile force so as to be unable to exert sufficient pressure on the bumper bar 80 and bumper plate 79 to frictionally disengage a load of bales 35 from the head 1. The force exerted by cylinder 73, however, when added to the frictional retarding force created by the frictional contact between downwardly exposed portions of head supported bales and the stack top layer 81 of bales, is sufficient to unload the supported layer 82 of bales as the tractor is backed rearwardly from the stack 83. In addition, the pressure exerted on the bales in the supported layer 82 by the cylinder 73 urges the respective bales together in a direction longitudinally of the tractor to create tight weather-resistant seams therebetween.

Elongated forwardly extending generally horizontal telescopically extensible arms 84 have front ends 85 and rear ends 86. The arms 84 are pivotally secured slightly forwardly of the rear ends 86 thereof at 87 to the respective mast members 24 for pivoting in a vertical plane. A hydraulic cylinder 88 is pivotally secured at one end 89 thereof with respect to the mast members 84 and at the other end thereof to a bar 90 secured to and extending between the extensible arm rear ends 86. A transverse tine bar 91 is mounted on the extensible arm front ends 85 and extends normally above the level of the supported bale layer 82. The tine bar 91 has depending spaced apart tines 92 fixed thereto and located between adjacent pairs of bale supporting teeth for engaging bales 35 located thereunderneath. An elongated forwardly extending hydraulic cylinder 93 is secured at opposite ends thereof to the center of the transverse tine bar 91 and to a rear transverse bar 94 secured between the extensible arms 84. The cylinder 93 is adapted to selectively extend the extensible arms to a forward position wherein the tines are aligned with the last row 95 of bales in a stack when the teeth tips 51 are adjacent the forward-most seams 96 of the first bale row 97 of the stack. The hydraulic cylinder 93 is adapted to retract the telescoping extensible arms 84 under considerable pressure, after the cylinder 88 is actuated to engage the tines 92 in the last row of bales, to urge the tips 51 into the seams 96 without requiring excessive forward force on the stack due to the forward motion of the head driven forwardly by the tractor. This is a great aid in reloading bales from a stack, particularly when the bales are frozen together as is noted hereinafter.

In operation, for sweeping or picking up elongated rectangular bales which have been dropped by mobile baling machinery to the ground in the normal end-aligned spaced apart relation, the head is lowered to a position where the teeth are substantially at ground level and driven forwardly at considerable speed for example, 10 to 30 miles per hour. The teeth are opened or spread apart by the cylinders 68 and the head is driven in a line toward the ends of the bales. The bales are picked up longitudinally between one inner and one outer tooth on each side of the head as illustrated at 98 and 99, FIG. 5.

In order to produce a bale stack which is strongly self-supporting by being cross-tied, it is highly desirable that the respective bales in each layer be picked up in a pattern which includes both longitudinally and transversely extending bales. To accomplish this the inner teeth, which are normally spread apart approximately about twice the distance between the respective inner and outer teeth, receive the bales transversely in the following manner: The head 1 is driven longitudinally toward the bale, designated 100 as if it were to be picked up at 98 or 99, but the tip 51 of one of the inner teeth 29 or 30 is caused to strike the bale at a position offset from the longitudinal center thereof whereby the bale is forced to turn approximately 90° through the position indicated by the broken lines 101 whereupon it enters between the inner teeth and comes to rest on the inside horizontal legs 32'.

Prior to picking up the bales between the inner teeth, the cylinders 68 are actuated to reduce the distance between the respective inner and outer teeth which was increased to ease pick-up. This is done to avoid possibility of losing one of the outer bales after pickup. After the bales are picked up between both the outer and the inner teeth a square bale pattern is produced, in the illustrated example, having eight bales, the outside bales extending longitudinally of the head and the inside bales extending transversely thereof. It is to be understood, however, that variations in the number and spacing of the teeth can be made to produce other cross-tie bale patterns without departing from the scope of this invention. Further actuation of the cylinders 68 squeezes all the bales in the pattern closely together in the direction transversely of the head 1. The tractor is then driven to the place of deposit where the supported layer of bales is aligned with the previously deposited layer but rotated 90° therefrom to produce a cross-tie. The supported layer of bales is lowered downwardly onto the stack and the head 1 is pivoted slightly upwardly and forwardly (arrow 101′, FIG. 3) so that the teeth pivot with respect to the supporting structure in the manner illustrated by the broken lines at 102 (FIG. 4). This frees the teeth from vertical pressure and greatly aids in insuring completely flat engagement between the top layer of the stack and the layer to be deposited whereby maximum friction is created between the respective layers for easy withdrawal of the teeth from the newly created stack seams.

To insure that the withdrawal of the teeth from the stack will not displace the bales being deposited or pull the stack over the cylinder 73 is actuated which, as noted above, is underpowered so as to be unable to push the bales off the teeth but creates enough force against the bumper members 79 and 80 to balance the frictional force created by withdrawing the teeth from the stack. This action also compresses the bales together longitudinally of the head. Little force is exerted on the stack which would tend to push or pull it over or displace any bales from the desired position thereon. It is noted that the operation of the cylinder 73 is substantially independent of the speed of backing the tractor to withdraw the teeth so that unusual skill or coordination is not required in unloading the bales onto the stack. After withdrawal of the teeth they are spread apart, the bumper members 79 and 80 retracted and the tractor is driven to the field for another load.

When it is desired to unload a layer of bales from a stack, consideration must be taken of the fact that the stacks often sag or warp out of shape varying the spacing of the seams between the respective bales. The above noted flexibility of the teeth permits the tips 51 to move both vertically and laterally in seeking the seams when the teeth are driven into the stack. In this latter regard, the teeth supporting structure may also be slightly tilted with respect to the teeth after tip entry into the seams to produce a minimum friction or danger of jamming of the teeth tips during the insertion. Also, positive lateral adjustment of the teeth by the cylinders 68 may be obtained if desired. Normally this insertion will produce insufficient frictional force to upset the stack, however, during the winter the stacks often become frozen together which produces a substantial resistance to the entry of the tips 51 into the stack seams. Under these conditions the tine bar 91 is extended to the last row 95 of the stack and the tines 92 engaged therewith. The subsequent retraction of the extensible arms 84 tends to balance the forward pressure applied by the tips 51 in seeking entry into the seams and thus reloading may occur without danger of upsetting the stack. Greater care must be taken in using the tine mechanism than in using the retainer or bumper mechanism described above since the pressure needed to produce entry into a frozen stack is less predictable.

Referring to FIG. 7 a modified embodiment of this invention is illustrated which includes a central tooth 103 equidistant between the inner teeth to produce five substantially equal spaces between the respective teeth. The embodiment of FIG. 7 is particularly valuable in conveniently handling cylindrical bales 104 which are sometimes preferred. A retainer or bumper mechanism 105 is used as above described, however, with cylindrical bales at tine mechanism for tip entry into the stack is usually unnecessary.

It is to be understood that while certain forms of this invention have been illustrated and described it is not to be limited to the specific form or arrangement of parts herein described and shown except insofar as such limitations are included in the claims.

What I claim and desire to secure by Letters Patent is:

1. A mobile bale handling head for use on load elevating apparatus forming part of a self-propelled tractor or the like, said head comprising: teeth supporting structure, a plurality of laterally spaced apart forwardly directed teeth mounted on said structure, said teeth normally extending horizontally and parallel to each other, each of said teeth including an upwardly extending leg and a horizontal leg extending toward each adjacent tooth, and remotely controllable means cooperating between said teeth and said structure for selectively varying the lateral spacing between said teeth for grasping bales between adjacent upwardly extending legs while resting on adjacent horizontal legs.

2. The bale handling head as set forth in claim 1 wherein said teeth are relatively loosely mounted on said supporting structure permitting limited arcuate horizontal movement of said teeth under lateral pressure.

3. The bale handling head as set forth in claim 2 including means cooperating between said teeth and said supporting structure for returning said teeth to normal extending positions following release of said lateral pressure.

4. A mobile bale handling head for use on load elevating apparatus forming part of a self-propelled tractor or the like, said head comprising: teeth supporting structure, a plurality of teeth mounted on said structure, said teeth including laterally spaced apart bale edge supporting beam portions extending parallel to each other and normally extending horizontally forwardly of said tractor and terminating in bale stack insertable tips, extensible means mounted on said structure and extending forwardly thereof and terminating in tine members, and motive means cooperating with said extensible means to selectively extend said extensible means forwardly past said tips, motive means cooperating with said extensible means for urging said tine members downwardly to engage said tine members into a top layer of stacked bales, said motive means being adapted to selectively retract said extensible means for urging said tips beneath said top layer of stacked bales as said tractor is driven toward the stacked bales.

5. A mobile head for handling elongated rectangular bales, said head being adapted for use on load elevating apparatus forming part of a self-propelled tractor or the like, said head comprising: teeth supporting structure, a plurality of teeth mounted on said structure, said teeth including a pair of inner and a pair of outer laterally spaced apart bale edge supporting beam portions extending parallel to each other and normally extending horizontally forwardly of said tractor, said inner beam portions being in cross-section an inverted "T" having oppositely extending lower horizontal legs and a central upwardly extending leg, said inner beam portion upwardly extending legs being spaced apart approximately the length of a hay bale, said outer beam portions each being right angular in cross-section and having an inwardly extending lower horiozntal leg joined to an upwardly extending leg, said outer beam portion upwardly extending legs being spaced from the nearest inner beam portion upwardly extending leg a distance approximately the width of a hay bale.

6. The head as set forth in claim 5 including means on said structure and cooperating with said teeth for remotely adjusting the lateral distance between said beam portions for securing bales carried therebetween.

7. The head as set forth in claim 5 including means on said structure and cooperating with said teeth to permit free upward independent pivoting of said beam portions about said structure, said beam portions terminating at forward ends thereof in tips each having a downwardly and rearwardly sloping underside for urging the respective beam portion upwardly to ride over small obstructions at ground level during forward motion of said tractor.

8. The head as set forth in claim 1 wherein said teeth are substantially equally spaced apart for handling longitudinally extending cylindrical bales therebetween.

9. A mobile bale handling head for use on load elevating apparatus forming part of a self-propelled tractor or the like, said head comprising: teeth supporting structure, a plurality of teeth mounted on said structure, said teeth including a pair of inner and a pair of outer laterally spaced apart bale edge supporting beam portions extending parallel to each other and normally extending horizontally, and remotely controllable means cooperating between said teeth and said structure, said means being adapted to move said outer beam portions inwardly toward each other a predetermined distance without altering the position of said inner portions and then move said outer and inner portions inwardly toward each other simultaneously.

10. The head as set forth in claim 1 wherein the lateral spacing between adjacent teeth is unequal for supporting rectangular bales of greater length than width simultaneously transversely to each other.

11. The head as set forth in claim 1 including means cooperating between said teeth and structure for permitting free vertical pivoting of said teeth upwardly from the horizontal about said structure.

12. The head as set forth in claim 1 including bumper means adjacent said teeth for contacting bales on said horizontal legs, and motive structure connected between said bumper means and said supporting structure for selectively urging said bales forwardly of said teeth, said motive structure being proportioned so as to have insufficient force alone to move said bales off said teeth.

13. A mobile bale sweep and handling head for use on load elevating apparatus forming part of a self-propelled tractor or the like, said head comprising: teeth supporting structure, a plurality of laterally spaced apart forwardly directed teeth mounted on said structure, said teeth normally extending horizontally parallel to each other, each of said teeth including an upwardly extending leg and a horizontal leg extending toward each adjacent tooth, said horizontal legs between adjacent teeth being adapted to support a hay bale at locations spaced apart on the under surface thereof, and adjustable means cooperating between said teeth and said structure for permitting the selective variation of lateral spacing between said teeth.

14. A mobile bale sweep and handling head for use on load elevating apparatus forming part of a self-propelled tractor or the like, said head comprising: teeth supporting structure, laterally spaced apart forwardly directed teeth mounted on said structure, said teeth normally extending horizonally and parallel to each other, each of said teeth including an upwardly extending leg and a horizontal leg extending toward each adjacent tooth, said horizontal legs between adjacent teeth being adapted to support a hay bale at locations spaced apart on the under surface thereof, and means cooperating between said teeth and structure for permitting free independent vertical pivoting of said teeth upwardly with respect to said structure.

15. A mobile bale sweep and handling head for use on load elevating apparatus forming part of a self-propelled tractor or the like, said head comprising: teeth supporting structure, and laterally spaced apart forwardly directed teeth mounted on said structure, said teeth normally extending horizontally and parallel to each other, each of said teeth including an upwardly extending leg and a horizontal leg extending toward each adjacent tooth, said horizontal legs between adjacent teeth being adapted to support a hay bale at locations spaced apart on the under surface thereof, said teeth being relatively loosely mounted on said structure permitting limited arcuate horizonal movement of said teeth under lateral pressure.

16. A bale handling head as set forth in claim 15 including means cooperating between said teeth and said supporting structure for returning said teeth in normal extending positions following release of said lateral pressure.

References Cited by the Examiner

UNITED STATES PATENTS

| | | | |
|---|---|---|---|
| 594,083 | 11/97 | Himel | 56—384 |
| 2,397,046 | 3/46 | Richey | 214—131 |
| 2,398,585 | 4/46 | Hayward | 214—140 |
| 2,412,643 | 12/46 | Maki | 214—144 |
| 2,601,932 | 7/52 | Turner | 214—514 |
| 2,793,482 | 5/57 | Jurgens | 171—63 |
| 2,822,101 | 2/58 | Schenkelberger | 214—730 |
| 2,996,204 | 8/61 | Jensen | 214—514 |
| 2,999,608 | 9/61 | Ganahl | 214—514 |